Patented Nov. 20, 1923.

1,474,482

UNITED STATES PATENT OFFICE.

FRANK T. LAHEY, OF AKRON, OHIO.

PLASTIC MATERIAL.

No Drawing.   Application filed October 10, 1921.  Serial No. 506,875.

*To all whom it may concern:*

Be it known that I, FRANK T. LAHEY, a citizen of the United States, residing at Akron, in the county of Summit and State of Ohio, have invented new and useful Improvements in Plastic Materials, of which the following is a specification.

This invention relates to new and improved composite material and to a novel and useful process of manufacturing same.

The main object of this invention is to provide a new material of great strength and durability which may be manufactured at a low cost and will possess all of the usual characteristics of leather in respect to toughness and flexibility and to provide a new and improved process of manufacturing said material.

It is a further object to provide a material which will be a non-conductor of electricity and may be used in a large number of ways as a substitute for vulcanite, vulcanized fiber or the like. While my improved product may be used in a large number of ways, it is particularly adapted for use in the manufacture of boots and shoes, trunks and similar containers; brushes, electrical insulators, and other electrical goods; shoe findings, molded goods and various other products.

A further object lies in the provision of a new and improved process whereby various ingredients may be compounded to produce a material capable of being molded or otherwise formed into various articles or parts and which when subjected to vulcanization will produce a strong, partially rigid waterproof product.

The above and additional objects are accomplished and additional ends are attained by the product and process of manufacture herein described, it being understood that my improved invention is adapted to be modified to suit various conditions and that changes and additions may be made or substitutions resorted to which come within the scope of the claims hereunto appended.

In manufacturing my improved material and carrying out my improved process ordinary or improved instrumentalities may be employed, the devices mentioned in the following specification being employed merely as a matter of convenience.

In carrying out my process, I take a fibrous substance, preferably dry paper or other fibrous materials, and place the same in a beating machine; add water and subject the same to the action of the machine until the paper or other fibers are subdivided as much as can be done in a beating machine, and formed into a pulpy mass, which for the purpose of this description may be termed pulp stock. I then take cotton fiber, preferably in the form of previously shredded articles composed of cotton and rubber, whether vulcanized or semi-vulcanized, and mix the same thoroughly with water to form a mass, consisting of fiber and rubber which may be termed mixed fiber and rubber stock. The fiber and rubber stock is then added to the pulp stock and the two stocks are thoroughly mixed. I then take an oleaginous substance which may be in the form of a drying, semi-drying or non-drying oil, and thoroughly mix said substance with an emulsifying agent, preferably ammonia, acetic acid, or formic acid, thus forming an emulsified, oleaginous mixture. The pulp stock and the fiber stock and the emulsified oleaginous mixture are then placed in a beating machine or other mixing device and are intimately comingled. This mixture is let stand a sufficient time to permit the ammonia or other emulsifying agent to volatilize, leaving the sulphur contained in the vulcanized or semi-vulcanized rubber intact. The mass is then subjected to heat or other process of evaporation until it is reduced to a state of dryness, leaving the oil which has been divided into minute particles by the action of the emulsifying agent, evenly distributed throughout the mass with the globules of oil adhering to the fiber and rubber. The degree of heat, however, should not char or otherwise injure the fiber so as to reduce in any degree the strength thereof.

By this treatment, the fiber in the paper, paper pulp, cotton fiber, etc., is comminuted, no reduction process taking place as may be instanced in hydrocellulose or oxycellulose.

The resultant compound is then put on a mill, and depending upon the amount of oil used, it forms a semi-plastic or plastic mass. To this mass is added raw rubber, which may be in the form of rubber latex or uncured rubberized fabric in various proportions, according to the material to be made, and additional sulphur is added, if necessary, to produce different degrees of rigidity and to produce a stock adapted to be vulcanized into a leather-like substance and used for various purposes, or the resultant mass may be molded, or otherwise shaped, and vulcanized to form various articles.

While the proportions of the various ingredients may vary considerably in accordance with the result desired, the following formula is given by way of illustration:

Two (2) pounds paper pulp.
Three (3) pounds shredded cotton and rubber scrap.
One (1) ounce linseed oil.
One (1) ounce commercial ammonia.
Three (3) pounds uncured pieces of rubberized fabric.
Six (6) ounces sulphur.

To two pounds of dry paper add water; put into beating machine and subject to the action of the machine until the paper is beaten to a pulp. Then take three pounds of previously shredded vulcanized or unvulcanized rubber scrap and thoroughly mix the same with water. The fiber stock thus formed is added to the paper stock and the two stocks are thoroughly beaten together. Then take one ounce of oil, either fish oil, linseed oil, soy-bean oil, chinawood oil, or petroleum distillate and add thereto, one ounce of commercial ammonia, thoroughly agitated, and add to the mixed paper and fiber stock. Subject the mass to the action of a mixing machine until the emulsified oil in a finely divided state is evenly distributed therethrough. The mass thus formed is permitted to stand until the ammonia is volatilized. The water is then evaporated or otherwise removed, three pounds of shredded uncured, rubberized fabric is added to the mass thus formed and thoroughly mixed therewith and sulphur is added, thus forming a composition of matter which may be molded or milled as desired into various articles.

Having thus described my improved process and the new material produced thereby, what I claim as new and desire to secure by Letters Patent is:—

1. A plastic material consisting of a fiber pulp, shredded rubberized fabric, an emulsified, oleaginous substance and sulphur.

2. That process of manufacturing a plastic material which comprises the following steps:—first, taking a fibrous substance adding water thereto and beating the same to a pulp; second, taking shredded, rubberized fabric and adding water thereto; third, thoroughly mixing the pulp with the shredded rubberized fabric; fourth, taking an oleaginous substance, adding an emulsifying agent thereto; fifth, adding the emulsified, oleaginous substance to the mixture formed by the pulp, and shredded rubberized fabric and mixing until the oleaginous substance is evenly distributed throughout the mass in a finely divided state; sixth, letting the same stand until the emulsifying agent has volatilized; seventh, subjecting the mass to a process of evaporation until it is reduced to a state of semi-dryness; eighth, adding raw rubber and sulphur; ninth, shaping the mass as desired and subjecting the same to vulcanization.

3. That process of manufacturing a plastic material which comprises, placing a fibrous substance in water and reducing the same to a pulp, mixing therewith shredded, rubberized fabric, mixing oil and an emulsifying agent, adding the emulsified oil to the mixture of pulp, and rubberized fabric, reducing the resultant mass to a state of semi-dryness, adding pieces of rubberized, unvulcanized fabric thereto, adding sulphur and subjecting the mass to vulcanization.

4. That process of manufacturing a plastic material which comprises, beating paper to a pulp in water, adding shredded, rubberized fabric, adding an emulsified oil and mixing the resultant mass until the oil is distributed therethrough in a finely divided state, subjecting the mass to a process of evaporation, adding raw rubber and sulphur and subjecting the mass to vulcanization.

5. That process of manufacturing a plastic material which comprises beating paper to a pulp in water, adding shredded, rubberized fabric, mixed with water, adding an emulsified oil, thoroughly mixing the resultant mass, subjecting the same to a process of evaporation, adding pieces of uncured, rubberized fabric and sulphur, thoroughly mixing, shaping the same as desired and subjecting to vulcanization.

6. That process of manufacturing a plastic material which comprises, adding a fiber pulp to a fiber and rubber stock, thoroughly mixing an emulsifying, oleaginous substance therewith, adding raw rubber and sulphur and subjecting to vulcanization.

In testimony whereof I have hereunto set my hand.

FRANK T. LAHEY.